(12) United States Patent
Brekke

(10) Patent No.: US 10,639,769 B2
(45) Date of Patent: May 5, 2020

(54) FASTENER INSTALLATION GUIDE

(71) Applicant: Columbia Insurance Company, Omaha, NE (US)

(72) Inventor: Steven Brekke, Lakeville, MN (US)

(73) Assignee: Columbia Insurance Company, Omaha, NE (US)

( * ) Notice: Subject to any disclaimer, the term of this patent is extended or adjusted under 35 U.S.C. 154(b) by 144 days.

(21) Appl. No.: 15/872,194

(22) Filed: Jan. 16, 2018

(65) Prior Publication Data

US 2019/0217454 A1 Jul. 18, 2019

(51) Int. Cl.
| | |
|---|---|
| *G01C 9/02* | (2006.01) |
| *G01C 9/10* | (2006.01) |
| *B25B 23/08* | (2006.01) |
| *B25B 23/00* | (2006.01) |
| *B25B 21/00* | (2006.01) |
| *B25B 15/00* | (2006.01) |

(52) U.S. Cl.
CPC .............. *B25B 23/08* (2013.01); *B25B 23/00* (2013.01); *B25B 23/0021* (2013.01); *B25B 23/0035* (2013.01); *G01C 9/02* (2013.01); *G01C 9/10* (2013.01); *B25B 15/005* (2013.01); *B25B 21/00* (2013.01); *B25B 23/0028* (2013.01); *G01C 2009/107* (2013.01)

(58) Field of Classification Search
CPC .......... E04B 1/2612; E04B 2001/2644; E04B 1/185; G01C 2009/107; G01C 9/02; G01C 9/10
USPC .......................................................... 33/371
See application file for complete search history.

(56) References Cited

U.S. PATENT DOCUMENTS

| | | | | |
|---|---|---|---|---|
| 3,664,754 A | * | 5/1972 | Kelbel ................. | B25H 1/0085 408/16 |
| 4,189,726 A | | 2/1980 | Rosa et al. | |
| 4,227,839 A | * | 10/1980 | Conway ............... | B25H 1/0092 408/112 |
| 6,694,631 B2 | | 2/2004 | Bone et al. | |
| 6,813,843 B1 | * | 11/2004 | Faubion ............. | B23Q 17/2233 33/520 |
| 7,287,681 B1 | * | 10/2007 | Wen ........................ | B25C 1/003 227/120 |
| 7,331,113 B1 | * | 2/2008 | Patrick ................. | B25H 1/0092 33/286 |
| 7,341,146 B2 | * | 3/2008 | Habermehl ........... | B25B 23/045 206/347 |
| 9,452,514 B2 | | 9/2016 | Guthrie et al. | |
| 9,651,373 B1 | | 5/2017 | Carpenter et al. | |
| 10,363,050 B2 | * | 7/2019 | McGinley .......... | A61B 17/1617 |
| 2002/0145724 A1 | * | 10/2002 | Wursch ................. | B23B 49/008 356/4.01 |
| 2006/0053643 A1 | * | 3/2006 | Adrian .................... | B23B 49/00 33/286 |

(Continued)

*Primary Examiner* — Yaritza Guadalupe-McCall
(74) *Attorney, Agent, or Firm* — Stinson LLP

(57) ABSTRACT

An installation guide for installing a screw at a predetermined angle relative to a reference plane is disclosed. The installation guide includes a housing configured for releasable connection to a bit. The housing includes a channel being sized and shaped to receive the bit therein for retaining the housing on the bit. The channel allows the bit to rotate relative to the housing. An indicator is supported by the housing and is configured for movement relative to the housing to indicate an angle of the housing relative to a reference plane.

21 Claims, 7 Drawing Sheets

(56) References Cited

U.S. PATENT DOCUMENTS

| | | | |
|---|---|---|---|
| 2007/0020055 A1* | 1/2007 | Ore | B23B 49/026 408/76 |
| 2012/0204409 A1* | 8/2012 | Vandenberg | B25B 21/002 29/468 |
| 2017/0189037 A1* | 7/2017 | McGinley | A61B 17/1617 |
| 2019/0217454 A1* | 7/2019 | Brekke | B25B 23/08 |

* cited by examiner

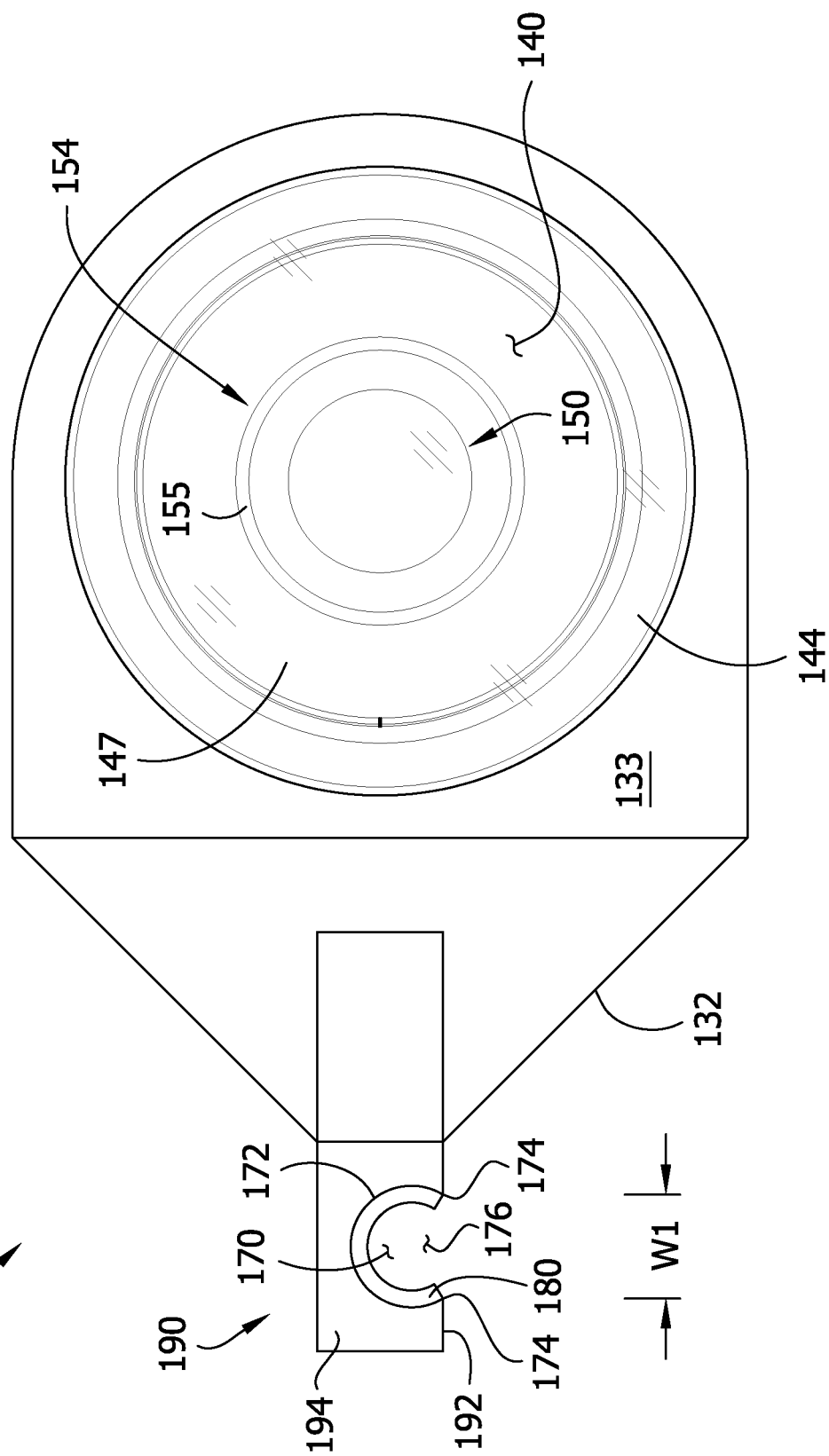

FASTENER INSTALLATION GUIDE

FIELD OF THE INVENTION

The present invention generally relates to a guide used to install a fastener, and more specifically, to an installation guide used to install a screw at an angle.

BACKGROUND

There are many uses for fastener installation guides in the construction, carpentry and power tool fields. In certain circumstances, it is preferable for fasteners, such as screws, to be installed at a horizontal or vertical orientation relative to the work surface. In other instances, a worker may need to install the fastener at a prescribed angle relative to the work surface. For example, building codes require the structural connection between wooden components, such as a top plate and a roof truss, to meet certain structural strength requirements. To have sufficient structural strength between framing components, toe-nailed connections with nails and spikes are installed at an angle near 30° to the vertical. Similarly, threaded fasteners, such as screws, are driven through the top plate and into the roof truss at an angle near 22.5±5° to the vertical, the optimum angle which maximizes the strength of the connection between the top plate and the roof truss.

Previous guides such as protractors, squares or other similar type devices are clumsy and require the operator to perform the difficult task of holding the guide and installing the fastener at the same time. Other guides, such as a bubble level, have been built into power tools but the majority of tools in use by operators don't include this feature. Moreover, some guides attach to the power tool, but these tools are bulky, clumsy, located remotely from the bit and take time to be attached and removed from the power tool.

SUMMARY

In one aspect, an installation guide for installing a screw using a tool having a bit where the installation guide includes a housing configured for releasable connection to the bit. The housing includes a channel with an opening outward of the housing, the channel being sized and shaped to receive the bit therein for retaining the housing on the bit. The channel is configured to allow the bit to rotate relative to the housing within the channel. An indicator is supported by the housing and is configured for movement relative to the housing to indicate an angle of the housing relative to a reference plane.

In another aspect, an installation guide kit for installing a screw using a tool that has a bit where the installation guide kit includes at least one screw. The screw has a head configured for engagement with the bit to be driven by the tool through rotation of the bit. The installation guide kit further includes an installation guide for indicating the angle of the bit relative to a reference plane. The installation guide includes an opening sized and shaped to receive the bit therein and configured to allow the bit to rotate relative to the installation guide within the opening. The installation guide also includes an indicator for movement relative to the opening to indicate the angle of the installation guide relative to a reference plane.

BRIEF DESCRIPTION OF THE DRAWINGS

FIG. 7 is a top view thereof;

Corresponding reference characters indicate corresponding parts throughout the drawings.

DETAILED DESCRIPTION

Figure 1:
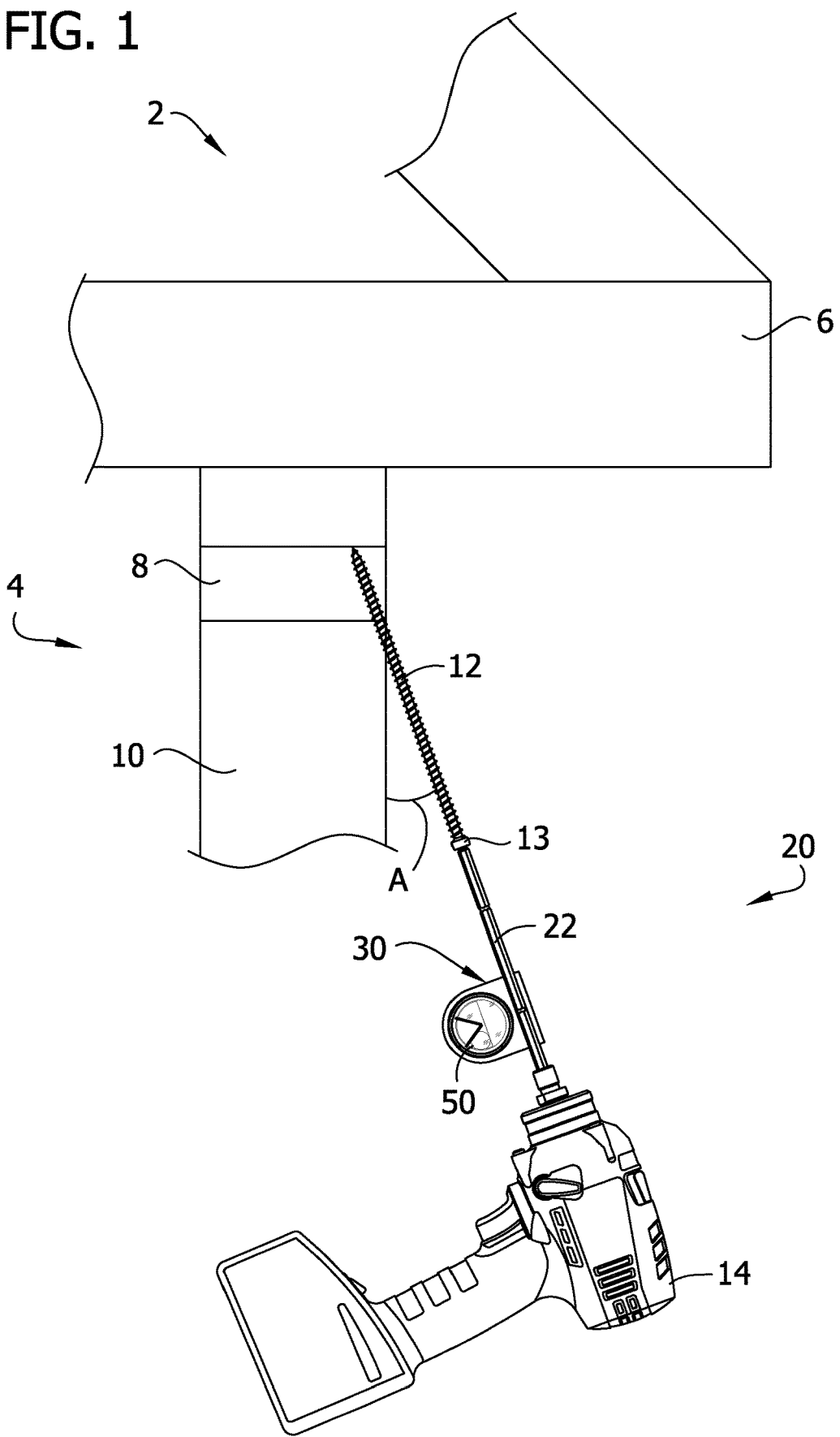
FIG. 1 is a front view of an installation guide kit according to the first embodiment of the present disclosure installing a screw in wood frame construction.

Referring to FIG. 1, an installation guide kit of the first embodiment of the present disclosure connecting a top plate 8 of a wall 4 to a roof truss 6 is generally indicated at 20. In this embodiment, part of a wood frame structure 2 is shown having a wood frame wall 4 including a stud 10 and a double top plate 8 at the top of the stud. The double top plate 8 supports one end of the wooden roof truss 6. The installation guide kit 20 is shown installing a screw 12 at an angle A with respect to a vertical reference plane through the double top plate 8 and into the bottom of the roof truss 6 to secure the roof truss to the top of the wall 4. The installation guide kit 20 includes a bit 22, an installation guide 30, a screw 12 and a tool 14. The installation guide 30 includes an indicator 50. As described in more detail below, the indicator 50 is configured to move to indicate the angle of the installation guide 30 and thereby the installation angle of the screw relative to a reference plane. It is to be understood that the wood frame structure 2 is illustrative and the installation guide kit 20 can be used to install a screw 12 at an angle A relative to any reference plane in other situations than described herein that are within the scope of the present invention.

Figure 2:
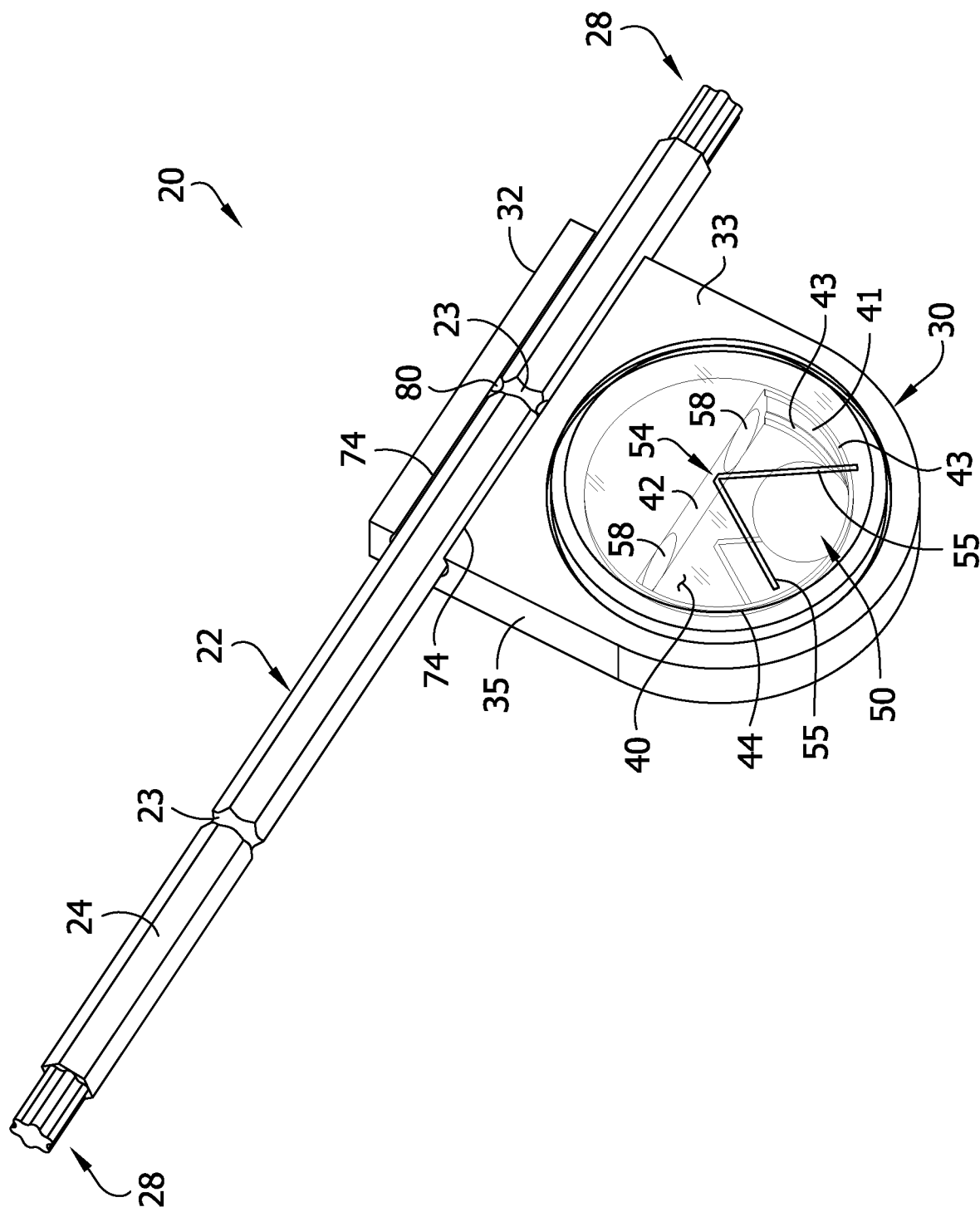
FIG. 2 is a perspective view of a bit and installation guide of the installation guide kit of FIG. 1.
Figure 3:
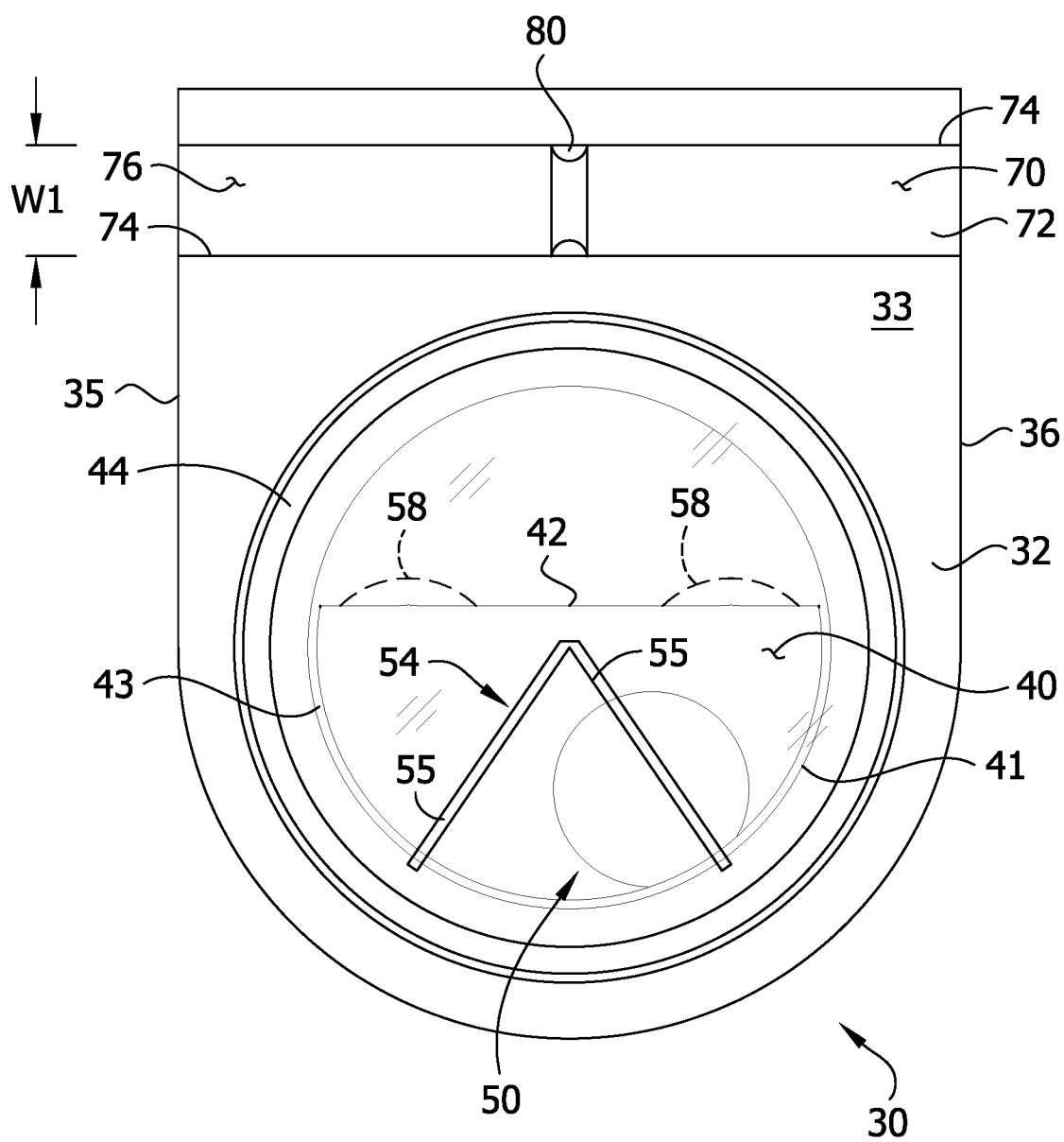
FIG. 3 is a front view of the installation guide of FIG. 2.
Figure 4:
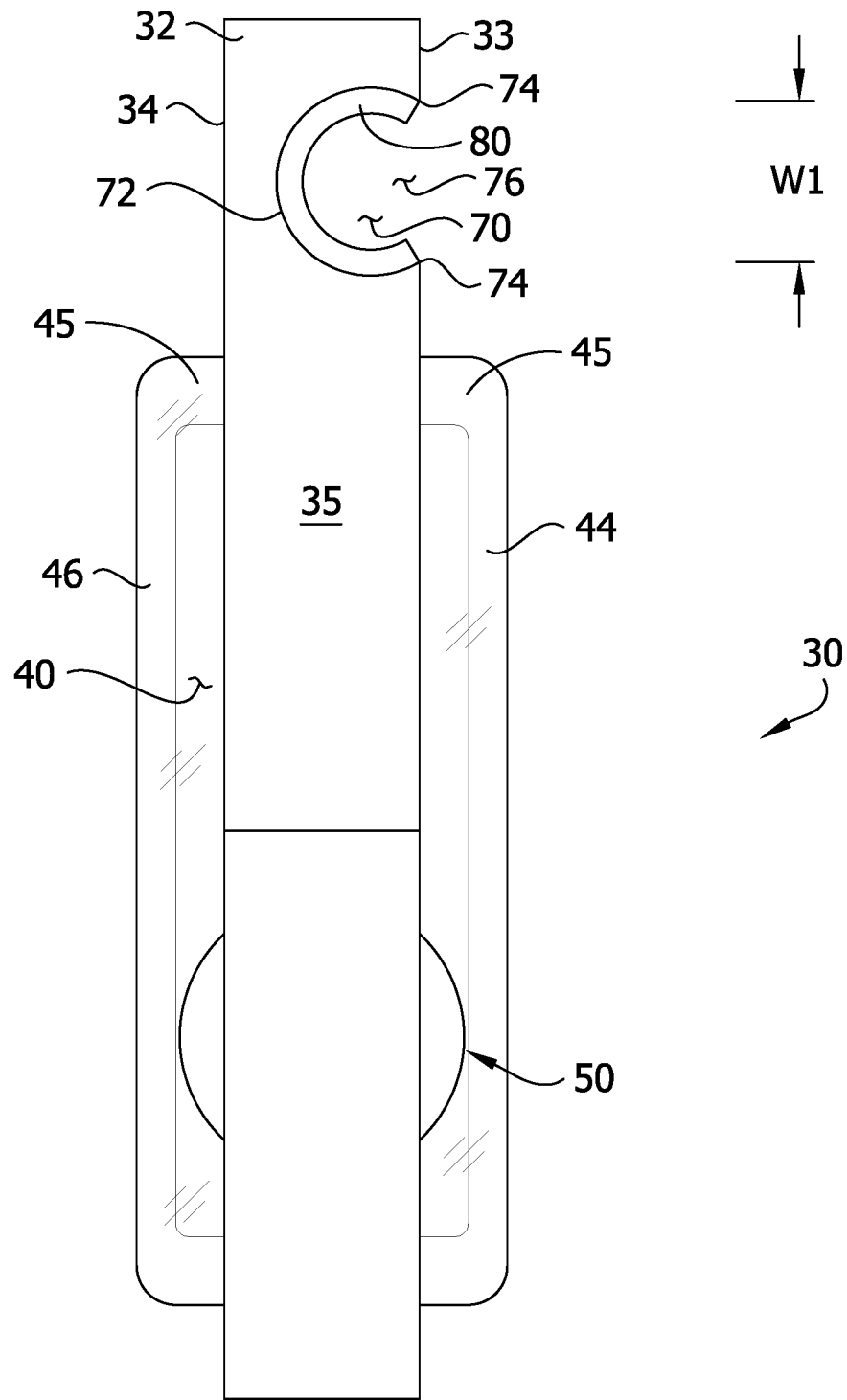
FIG. 4 is a side view thereof.

Referring to FIGS. 2-4, the installation guide 30 includes a housing 32 having opposite front and back surfaces 33, 34 and opposite first and second side surfaces 35, 36 extending between and generally perpendicular to the front and back surfaces. A channel or opening 70 extends along the housing 32 with a first open end at the first side surface 35 and a second open end at the second side surface 36. As described in more detail below, the channel 70 is sized and shaped to receive the bit 22 therein for connecting the housing 32 to the bit. The channel 70 is defined by a curved inside channel surface 72 of the housing 32. The channel or opening 70 has a partially circular or C-shaped cross section (FIG. 4). The partially circular cross section of the channel 70 extends through an angle of greater than 180°, but less than 360°. In one embodiment, the cross section extends through an angle between 190° and 230°. The partially circular cross section of the channel 70 has a radius greater than a radius of the bit 22 (i.e. a diameter greater than a diameter of the bit). In the preferred embodiment, the radius of the channel 70 is approximately 0.145±0.015 inches (3.7±0.4 mm) Opposite channel edges 74 at the intersections of the inside channel surface 72 and front surface 33 define, in part, a channel opening 76 having a width W1 (FIG. 3). The width W1 defined by the opposite channel edges 74 is less than the maximum cross sectional dimension of the bit 22 so that the housing 32 has to be resiliently deformed to receive the bit into the channel 70. The channel opening 76 extends along the length of the channel 70 on the front surface 33 between the first and second open ends. The housing 32 is made of plastic such as polypropylene or any other suitable material that can deflect without breaking and return to its original shape.

Referring to FIGS. 3 and 4, a positioning element 80 is attached to the housing 32. As described in more detail below, the positioning element 80 is configured to engage the bit 22 to prevent the movement of the installation guide 30 along the length of the bit. In the illustrated embodiment, the positioning element 80 is a circular ring extending from the inside channel surface 72 into the channel 70. The ring 80 is configured to be received in a corresponding groove 23 in the bit 22. The ring 80 has a partially circular or C-shaped cross section with an inside radius less than the radius of the bit 22. In the preferred embodiment, the inside radius of the ring 80 is approximately 0.105±0.015 inches (2.7±0.4 mm).

The housing 32 defines a compartment 40 spanning between the front and back surfaces 33, 34. The compartment 40 is spaced apart from the channel 70 and is partially semi-cylindrical in shape. The compartment 40 is defined by a curved track surface 41 and a reference surface 42 extending between opposite ends of the track surface. The track surface 41 and reference surface 42 extend between the front and back surfaces 33, 34 with the compartment 40 defined therebetween. The track surface 41 is located to the side of the reference surface 42 opposite the channel 70, such that the reference surface is positioned between the track surface and the channel. As seen in FIG. 3, the track surface 41 is curved in a partially circular or C-shaped configuration. In the preferred embodiment, the radius of the track surface 41 is approximately 0.5625±0.015 inches (14.3±0.4 mm). The reference surface 42 extends between opposite ends of the track surface 41 and is parallel to the channel 70. However, other orientations or configurations of the reference surface 42 are within the scope of the present invention. The track surface 41 may include two rails 43. The rails 43 extend along the length of the track surface 41, with one rail adjacent to the front surface 33 and the other rail adjacent to the back surface 34.

The indicator 50 is positioned in the compartment 40 and is movable within the compartment with respect to the housing 32. As described in more detail below, the movement of the indicator 50 within the compartment 40 indicates the angle of the installation guide 30 relative to a reference plane. More specifically, the indicator 50 indicates the angle of the channel or opening 70, and therefore the bit 22 received therein, relative to a reference plane. In the preferred embodiment, the indicator 50 is a ball made of metal, such as steel. However, any suitable material for the ball 50 is within the scope of the present invention. The ball 50 is supported by the track surface 41 and is able to move or roll along the track surface under the influence of gravity. The ball 50 will always seek to find the lowest point on the circular track surface 41 as the installation guide 30 is tilted. Opposite front and back windows 44, 46 are located on either side of the compartment 40. Front window 44 is secured to the front surface 33 and back window 46 is secured to the back surface 34. The ball 50 is secured in the compartment between the front and back windows 44, 46. In the illustrated embodiment, the front and back windows 44, 46 include offset rings 45 to offset the front and back windows from the front and back surfaces 33 and 34, respectively. As shown in FIG. 4, the diameter of the ball 50 is larger than the depth of the housing 32, thus the front and back windows 44, 46 are offset to accommodate the size of the ball. The front and back windows 44, 46 are transparent and allow the operator to observe the position of the indicator 50 within the compartment 40. The front and back windows 44, 46 can be made from plastic, acrylic or any other suitable material that is transparent. In the illustrated embodiment, the front and back windows 44, 46 are secured to the housing 32 with adhesive. Other ways of securing the front and back windows 44, 46 to the housing 32 are within the scope of the present invention.

Referring to FIG. 2, the indicator has two methods for indicating the angle of the installation guide kit 20 relative to a reference plane. In the first method, an indicator guide 54 is configured to cooperate with the indicator 50 for indicating a first position of the housing 32 relative to a reference plane. The indicator guide 54 is placed on both of the front and back windows 44, 46, but could be on only one of the windows. The indicator guide 54 includes two lines 55 forming a V-shape with the point positioned near the center of the reference surface 42 and the two free ends positioned near the track surface 41. In the illustrated embodiment, the indicator guide 54 is oriented to indicate when the installation guide 30 is in a horizontal position or, more specifically, to indicate when the bit 22 received in the housing 32 is parallel to a horizontal reference plane. This orientation corresponds to the ball 50 being positioned at the bottom point of the track surface 41 or the point on the track surface that is furthest from the channel 70. However, it is understood there can be other orientations of the indicator guide 54 or additional lines 55 to indicate different angles of the installation guide 30 relative to either horizontal or vertical planes. To horizontally position the bit 22, the operator tilts the installation guide kit 20 until the indicator 50 moves in-between the two lines 55 of the indicator guide 54. Once the indicator 50 is located between the two lines 55, the installation guide kit 20, and therefore the bit 22 and screw 12, are generally horizontal (not shown).

In the second method for indicating the angle of the installation guide kit 20, the indicator 50 is configured to engage the reference surface 42 to indicate a predetermined angle (second position) of the housing 32 relative to a reference plane. As the installation guide 30 is tilted by the operator, the ball 50 moves around the circular track surface 41 under the influence of gravity. Once the housing 32 of the installation guide 30 is tilted far enough, the ball 50 contacts or engages the reference surface 42. This point of contact between the ball 50 and the reference surface 42 corresponds to a specific angle A of tilt the installation guide 30 experiences, as shown in FIG. 1. Thus, the reference surface 42 can be positioned such that the ball 50 contacts or engages the reference surface 42 at a predetermined angle. The exact predetermined angle indicated by the indicator's 50 engagement with the reference surface 42 depends upon the size of the indicator, the size of the compartment 40 and the position of the reference surface. In the illustrated embodiment, the reference surface 42 is located at approximately 0.633±0.015 inches above the bottom point of the track surface 41. This location corresponds to the ball 50 engaging the reference surface 42 when the bit 22 and installation guide 30 are titled approximately 20° relative to a vertical reference surface (FIG. 1). This configuration allows an operator to use the installation guide kit 20 to install screws within the 22.5±5° to the vertical required to have sufficient structural strength in the connection between the top plate and the roof truss. By changing the position of the reference surface 42, the installation guide 30 can be constructed to indicate other angles as well. For example, if a larger angle to a vertical reference plane is desired, the reference surface 42 is positioned closer to the bottom point of the track surface 41. Conversely, if a smaller angle to a vertical reference plane is desired, the reference surface 42 is positioned farther from the bottom point of the track surface 41. It is understood that the reference surface can be positioned to indicate various different angles relative to a horizontal or vertical reference plane.

Referring to FIGS. 1 and 3, the reference surface 42 may include one or more depressions 58 adjacent the track surface 41. In the illustrated embodiment, the reference surface 42 includes two depressions 58, one next to each end of the track surface 41. The depression 58 is configured to receive the indicator 50 to indicate the angle of the housing 32 relative to a reference plane has diverged from the predetermined angle in one direction. The depression 58 has a concave shape conforming to the shape of the ball 50 and can receive at least a portion of the ball. However, other shapes of the depression 58 are within the scope of the present invention. To orient the installation guide 30 with depressions 58 at the prescribed angle, the operator tilts the installation guide until the leading edge of the ball 50 is in alignment with the reference surface 42. When the ball 50 is received in the depression 58 such that the operator cannot observe the leading edge of the ball, the angle of the housing 32 relative to the vertical reference plane has diverged from the predetermined angle in one direction. In other words, the operator has tilted the installation guide kit 20 too far. When the operator observes the leading edge of the ball 50 spaced from the reference surface 42, the angle of the housing 32 relative to the vertical reference plane has diverged from the predetermined angle in a second direction opposite the first direction. In other words, the operator has not tilted the installation guide kit 20 far enough.

Referring to FIG. 2, the bit 22 includes a shaft 24 with a screw driving element 28 located at each end of the shaft. In the illustrated embodiment, the driving element 28 at each end of the shaft 24 is a 6-lobe drive end or star end and is used to engage the head of a corresponding screw to rotate and drive the screw into the top plates 8 of the wooden structure 2 (FIG. 1). However, it is understood that any type of drive end configuration used to engage the head of any type of screw is within the scope of the present invention. The shaft 24 has a hexagonal cross section and is smaller than the diameter of the channel 70 but larger than the width of the channel opening 76. As explained in more detail below, this configuration allows the shaft 24 to rotate freely within the channel 70 while remaining connected to the installation guide 30. In the preferred embodiment, the shaft 24 has a diameter or width between opposite faces of the hexagon of approximately 0.225±0.015 inches (5.7±0.4 mm). The shaft 24 can be any length that is longer than the channel 70. In the illustrated embodiment, the shaft 24 is six inches (152 mm) long. The shaft 24 includes at least one recessed groove 23 around the circumference of the shaft. The groove 23 is configured to receive the ring 80 of the housing 32. When the bit 22 is attached to the installation guide 30 the ring 80 extends into the groove to prevent the installation guide from moving along the bit. The groove 23 is slightly larger than the ring 80 to allow the bit 22 to freely rotate. The one or more grooves 23 are spaced apart from the end of the shaft 24 such that when the bit 22 is received in the installation guide 30, the bit extends out of each end of the channel 70. In the illustrated embodiment, two grooves 23 are spaced 1¾ inches (44.5 mm) from each end of the shaft 24, however other positions and additional grooves are within the scope of the present invention.

The housing 32 is configured for a releasable connection to the bit 22. The channel 70 of the housing 32 is configured to receive the bit 22 by snap fit connection. To attach the bit 22 to the installation guide 30, the bit 22 is positioned over the channel opening 76. The operator aligns the groove 23 of the bit 22 with the ring 80 of the housing 32. If the bit 22 includes more than one groove 23, the operator chooses the appropriate groove to align. Once the ring 80 and groove 23 are aligned, the operator presses the bit 22 in to the channel 70 through the channel opening 76. The diameter of the bit 22 is larger than the channel opening 76, so as the bit is pressed into the channel 70, the housing 32 deflects along the inside channel surface 72 to increase the width W1 of the channel opening, allowing the bit to pass through. Once the bit 22 is in the channel 70, the housing 32 regains or snaps back into its normal shape, thereby securing the bit 22 in the channel 70 (FIG. 2). The channel 70 is configured to allow the bit 22 to rotate in the channel relative to the housing 32. Because the shaft 24 of the bit 22 is smaller than the diameter of the channel 70, the bit is free to rotate within the channel. The ring 80 is received in the groove 23 of the bit 22 and prevents the housing 32 from moving lengthwise along the bit. Thus, the bit 22 is free to rotate in the channel 70 but is constrained against any axial movement in the channel. Because the width W1 of the channel opening 76 is smaller than the diameter of the bit 22, the bit remains in channel 70. When the bit 22 is received in the channel, the bit extends out the first and second open ends of the channel, allowing the bit to engage a screw 12 at one end and connect to a tool 14 at the other end. To remove the bit 22 from the installation guide 30, the operator pulls the bit through the channel opening 76 until the housing 32 deflects enough to allow the bit to pass through the channel opening.

Referring to FIG. 1, the installation guide kit 20 is shown installing screw 12 in wooden framing 2 at a 20° angle A to connect a double top plate 8 to a wooden truss 6. One end of the bit 22 is connected to a power tool 14 such as a power drill. Such a connection is known in the art and therefore a detailed description is omitted here. The driving element 28 at the other end of the bit 22 is meshed with a head 13 of a screw 12. The installation guide kit 20 is tilted by moving the power tool 14 until the indicator 50 interacts with the reference surface 42. In this example, the installation guide 30 has a reference surface 42 configured to indicate when the bit 22, and therefore the screw 12, is at a 20° angle relative to a vertical plane. The engagement of the ring 80 and the groove 23 prevents the installation guide 30 sliding along the bit 22 as the installation guide kit 20 is tilted. Once the indicator 50 is properly positioned in the compartment 40 to indicate the 20° angle, the operator uses the power tool 14 to rotate the bit 22 and install the screw 12 at that predetermined angle. The installation guide 30 hangs below the bit 22 during use but can be rotated out of the way by the operator during installation of the screw 12 if needed.

Figure 5:
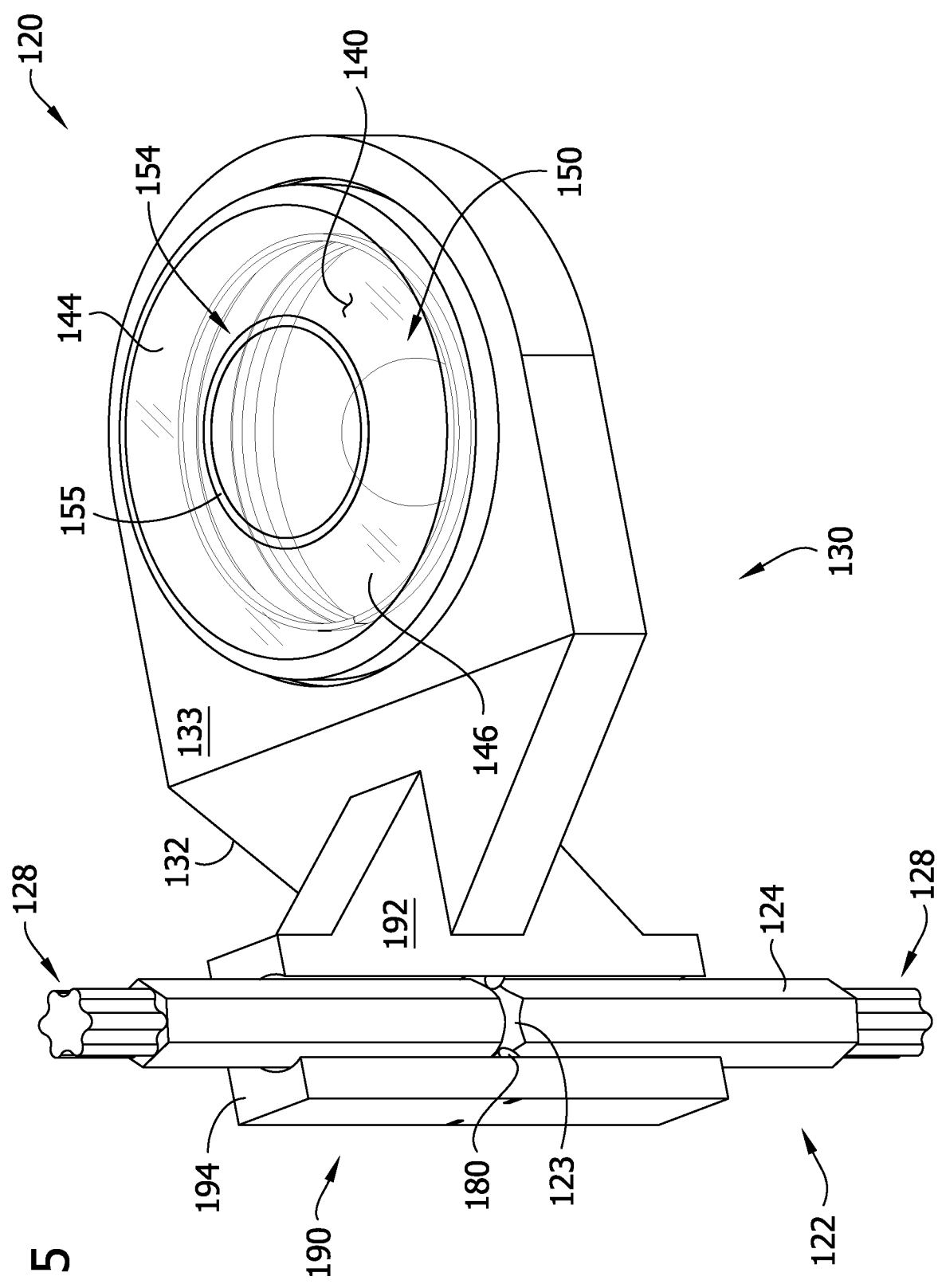
FIG. 5 is a perspective view of a bit and installation guide of an installation guide kit according to the second embodiment of the present disclosure.
Figure 6:
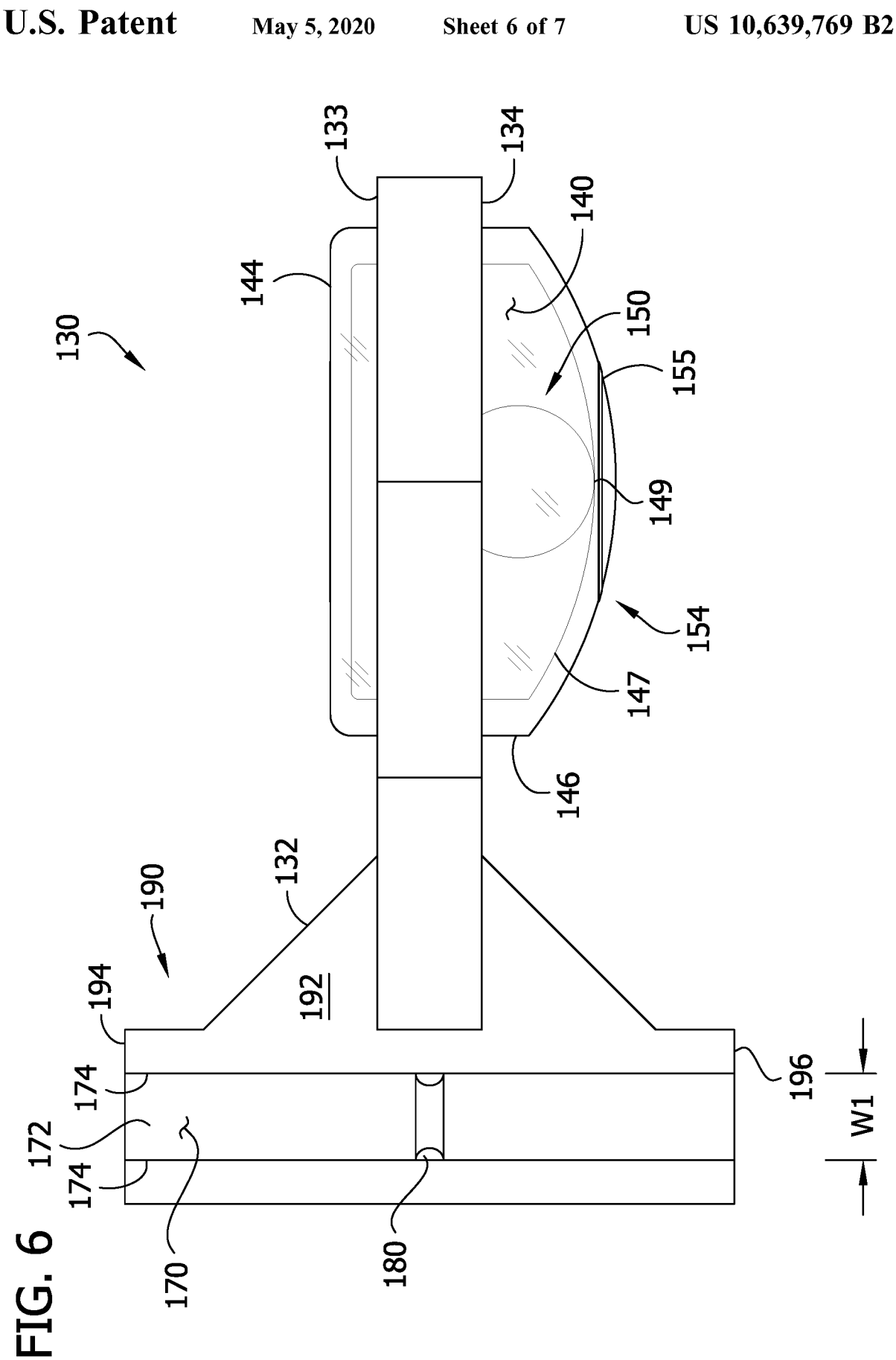
FIG. 6 is a front view of the installation guide of FIG. 5.

Referring to FIGS. 5-7, a second embodiment of the installation guide kit 120 is shown. For ease of comprehension, where similar or analogous parts are used, reference designators "100" units higher are employed. The installation guide kit 120 is similar to the installation guide kit 20, however, the installation guide kit 120 is used to install a screw that is normal or perpendicular to a horizontal reference plane. The installation guide kit 120 includes a bit 122 to drive a screw (not shown) with a tool (not shown) and an installation guide 130 to indicate the angle of installation. The installation guide 130 includes an indicator 150. As described in more detail below, the indicator 150 is configured to move to indicate when the installation guide kit 120 is perpendicular to a horizontal reference plane.

The installation guide 130 includes a housing 132 having opposite top and bottom surfaces 133, 134. The housing 132 defines a compartment 140 that spans between the top and bottom surfaces 133, 134. The compartment 140 is generally cylindrical in shape, however, other shapes are within the scope of the present invention. The housing 132 includes a channel support 190 secured to and extending above and below the top and bottom surfaces 133, 134. The channel support 190 has a channel surface 192 extending between opposite top and bottom channel support surfaces 194, 196 of the channel support. The channel surface 192 is perpendicular or normal to the top and bottom surfaces 133, 134 and the compartment 140. The housing 132 is made of plastic such as polypropylene or any other suitable material that can deflect without breaking and return to its original shape.

A channel or opening 170 extends along the channel surface 192 of the channel support 190 and is perpendicular or normal to the top and bottom surfaces 133, 134 and the compartment 140. The channel 170 is similar to the channel 70 as described above and operates in the same way, except that when a bit 122 is received in the channel 170, the bit is perpendicular to the compartment 140. A positioning element 180 is attached to the housing 132 to prevent the movement of the installation guide 130 along the bit 122. The positioning element 180 is similar to the positioning element 80 as described above and operates in the same way.

The installation guide 130 includes an indicator 150 positioned within the compartment 140. The indicator 150 moves within the compartment 140 to indicate the angle of the installation guide 130 relative to a horizontal reference plane. More specifically, the indicator 150 indicates the angle of the channel or opening 170, and therefore the bit 122 received therein, relative to a horizontal reference plane. In the preferred embodiment, the indicator 150 is a ball made of metal, such as steel. However, any suitable material for the ball 150 is within the scope of the present invention. Opposite top and bottom windows 144, 146 are located over the top and bottom of the compartment 140 and trap or secure the ball 150 inside the compartment. The top and bottom windows 144, 146 are secure to the top and bottom surfaces 133, 134 of the housing 132 (respectively) with adhesive. The top window 144 is flat. The bottom window 146 has an interior concave surface 147 that supports the ball 150. The bottom point 149 (vertex) of the concave surface 147 is located in the center of the bottom window 146. The ball 150 moves or rolls around the concave surface 147 under the influence of gravity. The ball 150 will always seek to find the lowest point on the concave surface 147 as the installation guide 130 is tilted. When the installation guide 130 is in the position shown in FIG. 6, the lowest point on the concave surface 147 corresponds to the bottom point 149. When the ball 150 is in this position, the bit 122 of the installation guide kit 120, and therefore the screw (not shown), is perpendicular to a horizontal reference plane. The top and bottom windows 144, 146 are transparent and allow the operator to view the indicator 150. The top and bottom windows 144, 146 can be made from plastic, acrylic or any other suitable material that is transparent.

Referring to FIG. 5, an indicator guide 154 is placed on the top and bottom windows 144, 146. In this embodiment, the indicator guide 154 is a circle 155 placed on both the top and bottom windows 144, 146. The center of the circles 155 on the top and bottom windows 144, 146 are aligned with the bottom point 149 of the convex surface 147. As seen in FIG. 7, when the ball 150 is positioned at the bottom point 149 of the convex surface 147, the ball is entirely within the circles 155 on the top and bottom windows 144, 146 as viewed by the operator. To vertically position the bit 122, the operator tilts the installation guide kit 120 until the indicator 150 moves inside the circles 155 on the top and bottom windows 144, 146. When the indicator 150 is located inside the circles 155, the bit 122 is perpendicular to a horizontal reference plane.

Referring to FIG. 5, the bit 122 is substantially the same as bit 22 except bit 122 only has one groove 123. Otherwise, bit 122 is constructed and operates in the same way as bit 22, described above. The bit 122 is releasably attached to the installation guide 130 by snap fit, as described above. When the bit 122 is received in the channel 170, the bit is held perpendicular or normal to the top and bottom surfaces 133, 134 and the compartment 140.

In view of the above, it will be seen that the several features of the invention are achieved and other advantageous results obtained.

The installation guide kit can be easily attached to a power tool to install a screw. The installation guide can be constructed to indicate a variety of different installation angles relative to a reference surface. The installation guide can snap onto the bit and be restricted against movement along the length of the bit while still allowing the bit to rotate.

Having described the invention in detail, it will be apparent that modifications and variations are possible without departing from the scope of the invention defined in the appended claims. For example, where specific dimensions are given, it will be understood that they are exemplary only and other dimensions are possible.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above products without departing from the scope of the invention, it is intended that all matter contained in the above description and shown in the accompanying drawings shall be interpreted as illustrative and not in a limiting sense.

What is claimed is:

1. An installation guide for installing a screw using a tool having a bit, the installation guide comprising:
   a housing configured for releasable connection to the bit, the housing including a channel therein sized and shaped to receive the bit therein for retaining the housing on the bit, the channel being configured to allow the bit to rotate relative to the housing within the channel about an axis of rotation, the channel having an opening outward of the housing that opens in a direction generally perpendicular to the axis of rotation; and
   an indicator supported by the housing, the indicator configured for movement relative to the housing to indicate an angle of the housing relative to a reference plane.

2. The installation guide of claim 1, wherein the channel is configured to receive the bit by snap fit connection.

3. The installation guide of claim 2, wherein the channel has a partially circular cross section having a diameter greater than a diameter of the bit.

4. The installation guide of claim 3 wherein the partially circular cross section of the channel extends through an angle of greater than 180°, but less than 360°.

5. The installation guide of claim 4 wherein the opening is bounded at least in part by opposite edges of the housing, the opposite edges being spaced by a distance less than the maximum cross sectional dimension of the bit.

6. The installation guide of claim 1, wherein the housing further comprises a positioning element configured to prevent the movement of the housing along the bit.

7. The installation guide of claim 6, wherein the positioning element comprises a ring extending into the channel and configured to be received in a corresponding groove in the bit to prevent movement along the bit.

8. The installation guide of claim 1, wherein the housing defines a compartment, the indicator being located in the compartment and being movable within the compartment with respect to the housing.

9. The installation guide of claim 8, wherein the housing includes at least one window on a side of the compartment, the window being configured to allow a user to observe a position of the indicator within the compartment.

10. The installation guide of claim 9, wherein the housing includes a window on each side of the compartment, the indicator being secured in the compartment between the windows.

11. The installation guide of claim 9, further comprising an indicator guide on at least one of the windows.

12. The installation guide of claim 11 wherein the indicator guide is configured to cooperate with the indicator for indicating only one position of the housing relative to the reference plane.

13. The installation guide of claim 8, wherein the compartment includes a reference surface configured to engage the indicator to indicate a predetermined angle of the housing relative to the reference plane.

14. The installation guide of claim 13, wherein the reference surface includes a depression configured to receive the indicator to indicate the angle of the housing relative to the reference plane has diverged from the predetermined angle in one direction.

15. An installation guide kit for installing a screw with a tool having a bit, the installation guide kit comprising:
   at least one of the screws, the screw having a head configured for engagement with the bit to be driven by the tool through rotation of the bit;
   an installation guide for indicating the angle of the bit relative to a reference plane, the installation guide comprising:
   an opening sized and shaped to receive the bit therein, the opening configured to allow the bit to rotate relative to the installation guide within the opening; and
   an indicator for movement relative to the opening to indicate the angle of the installation guide relative to a reference plane.

16. The installation guide kit as set forth in claim 15 wherein the housing defines a compartment containing the indicator, the indicator being movable in the compartment.

17. The installation guide kit of claim 16 wherein the housing further comprises an indicator guide constructed to cooperate with the indicator for alignment with the indicator when the housing is in a predetermined position with respect to a reference plane.

18. The installation guide of claim 17, wherein the compartment includes a reference surface configured to engage the indicator to indicate a predetermined angle of the housing relative to the reference plane.

19. The installation guide of claim 18, wherein the reference surface includes a depression configured to receive the indicator to indicate the angle of the housing relative to the reference plane has diverged from the predetermined angle in a first direction, the indicator being visible spaced from the reference surface when the angle of the housing relative to the reference plane has diverged from the predetermined angle in a second direction opposite the first direction.

20. The installation guide of claim 17 wherein the housing opening is constructed for releasable, snap fit connection to the bit to retain the housing on the bit.

21. An installation guide for installing a screw using a tool having a bit, the installation guide comprising:
   a housing configured for releasable connection to the bit, the housing including a channel therein having an opening outward of the housing, the channel being sized and shaped to receive the bit therein for retaining the housing on the bit, the channel being configured to allow the bit to rotate relative to the housing within the channel; and
   an indicator supported by the housing, the indicator configured to move relative to the housing by the force of gravity acting directly on the indicator to indicate an angle of the housing relative to a reference plane.

* * * * *